No. 787,367. PATENTED APR. 18, 1905.
A. L. FRENCH.
STEAM TRAP.
APPLICATION FILED OCT. 21, 1904.

2 SHEETS—SHEET 1.

Witnesses:
Edna C. Cleveland
Nathan C. Lombard 2nd

Inventor:
Alton L. French,
by Walter E. Lombard,
Atty.

No. 787,367.

Patented April 18, 1905.

UNITED STATES PATENT OFFICE.

ALTON L. FRENCH, OF BROCKTON, MASSACHUSETTS.

STEAM-TRAP.

SPECIFICATION forming part of Letters Patent No. 787,367, dated April 18, 1905.

Application filed October 21, 1904. Serial No. 229,385.

*To all whom it may concern:*

Be it known that I, ALTON L. FRENCH, a citizen of the United States of America, and a resident of Brockton, in the county of Plymouth and State of Massachusetts, have invented certain new and useful Improvements in Steam-Traps, of which the following is a specification.

This invention relates to steam-traps, and particularly to that class of traps which have a float working in the water of condensation to actuate the discharge-regulating valve; and it consists in providing a steam-trap with two water seals for the more effective operation of the trap; and it also consists in providing a sediment-chamber in which the sediment conveyed to the trap from the steam-inlet will be collected and prevented from passing into the float-chamber to prevent the operation of the valve.

It further consists in certain novel features of construction and arrangement of parts, which will be readily understood by reference to the description of the drawings and to the claims to be hereinafter given.

Figure 1:
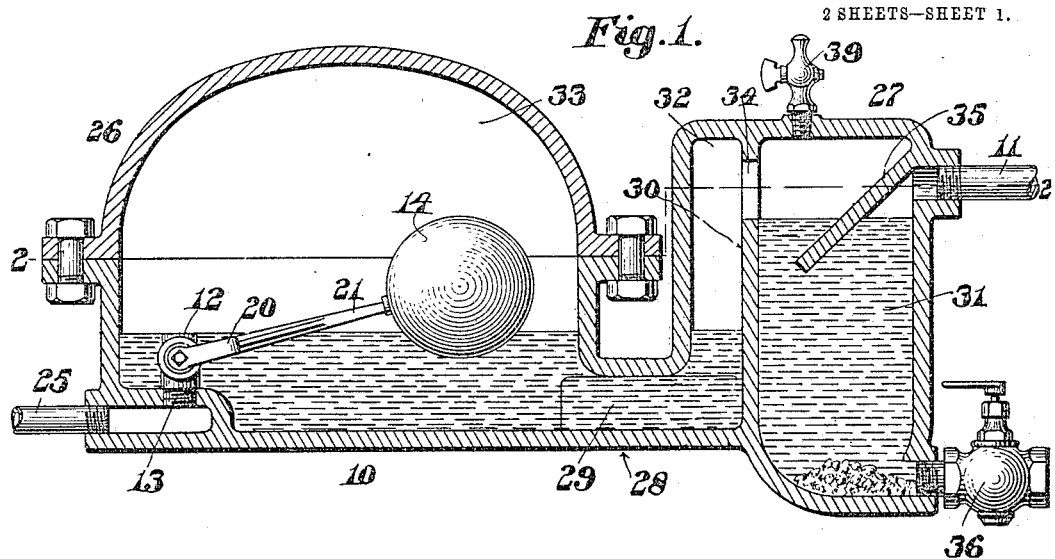
Figure 2:
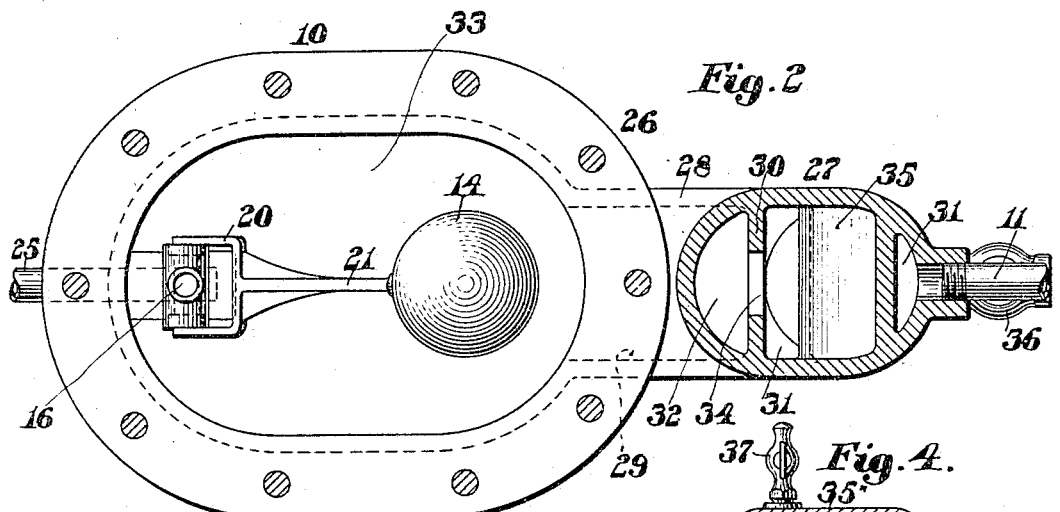
Figure 3:
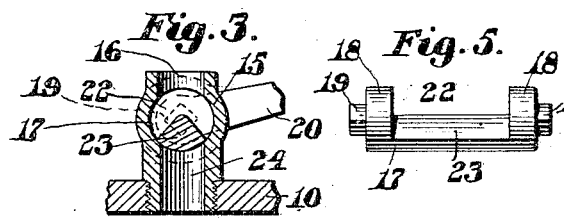
Figure 5:
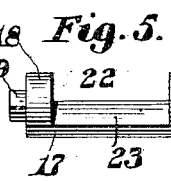
Figure 4:
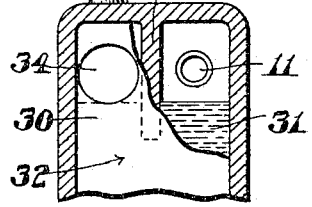
Figure 6:
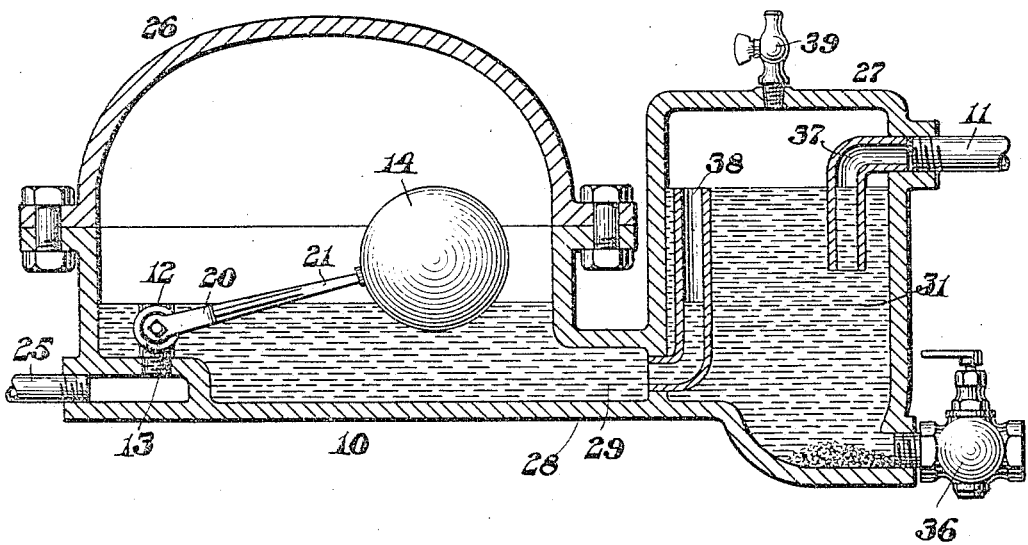

Of the drawings, Figure 1 represents a sectional elevation of the steam-trap embodying this invention. Fig. 2 represents a sectional plan of the same, the cutting plane being on line 2 2 on Fig. 1. Fig. 3 represents a sectional elevation of the outlet-valve. Fig. 4 represents a modification of the upper end of the sediment-chamber, showing a different means for deflecting the inflow downward. Fig. 5 represents an elevation of the valve; and Fig. 6 represents a sectional elevation of a trap, showing the modified form in which certain partitions are dispensed with and pipes used instead thereof.

Similar characters designate like parts throughout the several figures of the drawings.

In the drawings, 10 represents a casing of a trap, to which steam enters through an inlet 11. An outlet-valve 12 is provided in the opposite end of the trap mounted in a casing 13, said valve being operated by a float 14, which is raised and lowered by the water condensed within said trap, thereby opening and closing the valve 12, as desired.

The valve-casing 13 is screwed into the bottom of the trap-casing 10 and is provided with a horizonal cylindrical chamber 15, which communicates with the interior of the valve-chamber by means of the radial passage 16. In the cylindrical chamber 15 is mounted the rotary member 17, the ends 18 of the main portion thereof coinciding with the ends of said chamber. Each end 18 is provided with a squared projection 19, upon which is mounted the bifurcated arms 20 of the connector 21, to the outer end of which is secured the float 14.

The rotary member 17 is cut away between the ends 18 at 22, these ends being connected by the segment 23 of just sufficient width to close the passage 24 to the outlet 25.

It is obvious from an inspection of the drawings that when the water rises beyond a certain level, lifting the float therewith, the segment 23 will be moved about the axis of the rotary member 17 to uncover the passage 24 and open the valve.

The casing 10 is composed of two portions 26 27, connected at the bottom by a narrow contracted portion 28, through which a passage 29 connects the interior chambers of said portions 26 27. The portion 27 is divided by a partition 30, extending from the top to the bottom thereof and forming thereby in said portion 27 a sediment-chamber 31 and a passage 32, which connects with the passage 29.

The partition 30 is provided near its upper end with an opening or passage 34, connecting the passage 32 and sediment-chamber 31. In front of the inlet 11 is an inclined deflecting-plate 35, extending downwardly a short distance below the bottom of the opening or passage 34, so that the inflow from the inlet 11 is deflected by said plate 35 and directed downwardly toward the bottom of the sediment-chamber 31. This deflection of the inflow will cause any sediment which enters the trap through the inlet to be collected at the bottom of said sediment-chamber, while the steam will pass around the bottom of the plate 35, through the water contained within said chamber, and out through the opening 34 into the passages 32 29 into the valve-chamber 33.

In place of the inclined plate 35 a baffleplate 35*, as shown in Fig. 4, may be used, this plate extending downwardly from the upper wall of the sediment-chamber and extending transversely of said chamber at right angles to the plate 30 from wall to wall. The inlet 11 enters one of the compartments formed in the upper portion of the sediment-chamber thereby at a point above the lower end of said plate 35*, while the opening 34 in the partition 30 communicates with the other compartment through the passage 32. This construction secures the same result as that shown in Figs. 1 and 2.

If desired, the plates 30 35 35* may be entirely dispensed with and a pipe 37 used, as indicated in Fig. 6, the pipe 37 extending downwardly into the sediment-chamber 31 and connecting with the inlet 11. Another pipe 38, also shown in Fig. 6, would connect with the contracted passage 29, the upper end of said pipe being at a point above the lower end of the pipe 37. It is obvious that such a construction would accomplish the same results as the partitions and plates 30 35 35*.

The plate 35, extending downwardly into the sediment-chamber 31, provides a water seal, and the water in the valve-chamber and passage 32 being maintained at all times at a level with the upper part of the casing 13, which is above the upper wall of the passage 29, another water seal is thus provided.

The steam in passing through the sediment-chamber 31 and into the valve-chamber 33 is obliged to twice pass through the water maintained in said trap, thereby making the operation of the trap much more effective. The bottom of the sediment-chamber 31 is provided with a valve 36, through which the sediment collected in said chamber is permitted to be drained off.

Heretofore in steam-traps the sediment is permitted to pass throughout the trap and often gets into the valve 12, preventing its effective operation, and sometimes cuts the valve-seat to such an extent as to make it useless. This is entirely obviated by separating the sediment-chamber from the valve-chamber by means of the partition 30, which prevents any sediment from passing into the valve-chamber and interfering with the proper operation of the valve 12.

An air-cock 39 is mounted in the upper end of the sediment-chamber 31, permitting the exit of air from this chamber to prevent any undue resistance thereby. The simplicity of the valve 12 makes this very effective in its operation and owing to its rotary nature prevents any back pressure thereon from interfering with its proper operation. It is easy to construct and is so arranged that it can be readily installed without screws or other parts, which in the operation are liable to become disconnected.

It is believed that with the foregoing the invention will be thoroughly understood without further description.

Having thus described my invention, I claim—

1. In a steam-trap provided with a steam-inlet and an outlet, the combination of a valve-chamber, a sediment-chamber communicating at the top with said valve-chamber near its lower end, and a deflecting member in said sediment-chamber to direct the inflow downward to a point below said communicating passage.

2. In a steam-trap provided with a steam-inlet and an outlet, the combination of a valve-chamber, an outlet-valve, means for automatically operating said valve, a sediment-chamber communicating at the top with said valve-chamber near its lower end, and a deflecting member in said sediment-chamber to direct the inflow downward to a point below said communicating passage.

3. In a steam-trap provided with a steam-inlet and an outlet, the combination of a valve-chamber, a rotary outlet-valve, means for automatically operating said valve, a sediment-chamber communicating at the top with said valve-chamber near its lower end, and a deflecting member in said sediment-chamber to direct the inflow downward to a point below said communicating passage.

4. In a steam-trap provided with a steam-inlet and an outlet, the combination of a valve-chamber, an outlet-valve, a float therefor, a sediment-chamber communicating at the top with said valve-chamber near its lower end, and a deflecting member in said sediment-chamber to direct the inflow downward to a point below said communicating passage.

5. In a steam-trap provided with a steam-inlet and an outlet, the combination of a valve-chamber communicating with a contracted passage extending upwardly from the bottom, a sediment-chamber communicating at the top with said passage, and a deflecting member in said sediment-chamber to direct the inflow downward to a point below said communicating passage.

6. In a steam-trap provided with a steam-inlet and an outlet, the combination of a valve-chamber communicating with a contracted passage extending upwardly from the bottom, a sediment-chamber communicating at the top with said passage, and an inclined plate in front of the inlet-opening adapted to deflect the inflow downward to a point below said communicating passage.

7. In a steam-trap provided with a steam-inlet and an outlet, the combination of a valve-chamber communicating with a contracted passage extending upwardly from the bottom, a sediment-chamber communicating at the top with said passage, means for drawing off the sediment from said chamber, and an inclined plate in front of the inlet-opening adapted to deflect the inflow downward to a point below said communicating passage.

8. In a steam-trap provided with a steam-inlet and an outlet, the combination of a valve-chamber provided with a contracted passage extending upwardly from the bottom, a rotary valve, a float, a connector between said valve and said float, a sediment-chamber communicating at the top with said contracted passage, and a deflecting-plate in said sediment-chamber to direct the inflow downward to a point below said communicating passage.

9. In a steam-trap consisting of two compartments connected at the bottom by a contracted passage, a steam-inlet communicating with one of said compartments, a vertical partition dividing said inlet-compartment and forming a sediment-chamber and provided with a passage through said partition at the top, and a deflecting member in said chamber adapted to direct the inflow downward to a point below said communicating passage.

10. In a steam-trap consisting of two compartments connected at the bottom by a contracted passage, a steam-inlet communicating with one of said compartments, a vertical partition dividing said inlet-compartment and forming a sediment-chamber, a passage through said partition at the top, and an inclined plate in front of said steam-inlet adapted to direct the inflow downward to a point below said communicating passage.

11. In a steam-trap, provided with an outlet, the combination of a sediment-chamber, a plate dividing the upper part of said sediment-chamber into two compartments each communicating with said chamber at the bottom, a steam-inlet communicating with the top of one of said compartments, and a valve-chamber communicating with the top of the other compartment.

12. In a steam-trap, the combination of a float-chamber provided with a steam-inlet and an outlet communicating therewith, a cylindrical valve-casing provided with peripheral inlet and outlet openings one of which communicates with said chamber, a rotary valve therefor provided with trunnions extending beyond the ends of said casing, a float, and a connector between said float and said trunnions.

13. In a steam-trap, the combination of a float-chamber provided with a steam-inlet and an outlet communicating therewith, a cylindrical valve-casing provided with peripheral inlet and outlet openings one of which communicates with said chamber, a rotary valve for said casing provided with members projecting beyond the ends of said casing, a float, and a bifurcated arm for said float secured to said projecting members.

Signed by me at Boston, Massachusetts, this 19th day of October, 1904.

ALTON L. FRENCH.

Witnesses:
WALTER E. LOMBARD,
EDNA C. CLEVELAND.